(12) United States Patent
Wang et al.

(10) Patent No.: US 7,450,675 B2
(45) Date of Patent: Nov. 11, 2008

(54) MULTI-CHANNEL RECEIVER, DIGITAL EDGE TUNING CIRCUIT AND METHOD THEREOF

(75) Inventors: Hui-Min Wang, Tainan County (TW); Chung-Ming Huang, Tainan County (TW); Lin-Kai Bu, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 737 days.

(21) Appl. No.: 11/160,526

(22) Filed: Jun. 28, 2005

(65) Prior Publication Data

US 2006/0239383 A1 Oct. 26, 2006

(30) Foreign Application Priority Data

Apr. 20, 2005 (TW) .............................. 94112528 A

(51) Int. Cl.
*H04L 7/00* (2006.01)
(52) U.S. Cl. ..................... 375/354; 375/371; 327/149; 327/153; 327/158; 327/161
(58) Field of Classification Search ................ 375/354, 375/371, 373, 376; 327/149, 150, 153, 158, 327/159, 161; 370/517, 519
See application file for complete search history.

(56) References Cited

U.S. PATENT DOCUMENTS

| | | | |
|---|---|---|---|
| 3,908,084 A | 9/1975 | Wiley .................... 178/69.5 R |
| 4,012,598 A | 3/1977 | Wiley .......................... 375/371 |
| 5,022,056 A | 6/1991 | Henderson et al. .......... 375/373 |
| 5,487,095 A | 1/1996 | Jordan et al. ................. 375/371 |
| 5,946,268 A * | 8/1999 | Iwamoto et al. ........... 365/233.1 |
| 6,346,839 B1 * | 2/2002 | Mnich ......................... 327/158 |
| 6,727,740 B2 * | 4/2004 | Kirsch ......................... 327/161 |
| 6,937,076 B2 * | 8/2005 | Gomm ......................... 327/158 |
| 2006/0001465 A1 * | 1/2006 | Kwak et al. |

* cited by examiner

*Primary Examiner*—Dac V Ha
(74) *Attorney, Agent, or Firm*—Jianq Chyun IP Office

(57) ABSTRACT

A multi-channel receiver, digital edge tuning circuit and a method for operating the same is disclosed. The digital edge tuning circuit for tuning phases of an input signal and a clock signal, comprises a delay-tuning circuit for receiving the input signal and delaying the input signal to generate a fine-tuned signal; a delay set comprising a plurality of delays connected serially one by one, the input of the delay set coupled to the fine-tune circuit, for receiving the fine-tuned signal; a plurality of sample/hold circuits, each of the sample/hold circuits coupled to a corresponding output of one of the delays and the fine-tune circuit, for sampling and holding the corresponding output; and a dynamic edge tuning circuit, coupled to the sample/hold circuits, for controlling a common delay time delayed by the delay-tuning circuit according to which one of the sample/hold circuits samples a data edge of the input signal.

11 Claims, 4 Drawing Sheets

```
While(enable)
{
    Search=1;CoarseTune=0
    While(Search){
        Coarse_Tune++;
        If(GetDataEdge)  Search=0;
    }
    FineTune=16;Tuning=1;
    While(Tuning){
        If(Ln)  FineTune++;
        If(Lm)  FineTune+=4;
        If(Rn)  FineTune--;
        If(Rm)  FineTune-=4;
        If(Ln || Lm || Rn || Rm || C) CounterReset=1;
        If(FineTune>28) || (FineTune<4)  Tuning=0;
    }
}
```

FIG. 4

MULTI-CHANNEL RECEIVER, DIGITAL EDGE TUNING CIRCUIT AND METHOD THEREOF

CROSS-REFERENCE TO RELATED APPLICATION

This application claims the priority benefit of Taiwan application serial no. 94112528, filed on Apr. 20, 2005. All disclosure of the Taiwan application is incorporated herein by reference.

BACKGROUND OF THE INVENTION

1. Field of the Invention

The present invention relates to a phase synchronization circuit and a method thereof. More particularly, the present invention relates to a multi-channel receiver, digital edge tuning circuit and method thereof.

2. Description of Related Art

Transmission of digital signals, for example, over a digital bus using TTL or RS-232 levels or over a communications link such as a radio frequency channel or an optical fiber is well known in the art. In order to recover received data accurately, it is important to know the clock frequency of the transmitted data. This can be accomplished, for example, by using a highly stable crystal controlled clock of known frequency in the transmitter, and a similar highly accurate crystal controlled clock of the same frequency in the receiver. In this event, the frequencies are equal, although the phase of the received data stream with respect to the receiver clock cannot be guaranteed because the transmitter clock and the receiver clock are not phase controlled.

A typical structure for ensuring phase synchronization of the received data signal to the receiver clock includes a phase lock loop. A training sequence consisting of a number of non-data pulses is necessary for the phase lock loop to achieve phase lock. This overhead reduces the effective bit rate of the communication channel. Furthermore, the phase lock loop requires a large loop gain stabilization capacitor which typically cannot be formed on an integrated circuit device. The phase lock loop also requires a fair amount of circuitry, much of which is analog so that it is difficult to achieve a phase lock loop having the necessary precision and stability. It is even more difficult for such analog circuitry to be implemented in CMOS integrated circuits which are desirable for very low power consumption.

Other prior art techniques to quickly provide phase synchronization with an incoming signal is to use a very high frequency clock. However, this has severe drawbacks in being expensive and difficult to maintain a reliable very high frequency clock.

SUMMARY OF THE INVENTION

In one aspect, the present invention provides a multi-channel receiver comprising a plurality of input ports, a plurality of digital edge tuning circuits and a channel aligning circuit. Each of the input ports receives an input signal and the channel aligning circuit couples to the digital edge tuning circuits for receiving outputs from each of the digital edge tuning circuits. Each of the digital edge tuning circuits couples to a corresponding one of the input ports for receiving the input signal, wherein each of the digital edge tuning circuits comprises a delay-tuning circuit, coupled to the input port, for receiving the input signal, wherein the input signal being delayed to generate a fine-tuned signal; a delay set, comprising a plurality of delays connected serially one by one, wherein the input of the delay set is coupled to the fine-tune circuit for receiving the fine-tuned signal; a plurality of sample/hold circuits, each of the sample/hold circuits coupled to a corresponding output of one of the delays and the fine-tune circuit, for sampling and holding the corresponding output; a dynamic edge tuning circuit, coupled to the sample/hold circuits, for controlling a time period delayed by the delay-tuning circuit according to which one of the sample/hold circuits samples a data edge of the input signal; and an output terminal, coupled to one of the delays, for outputting the corresponding output of the coupled delay.

In another aspect, the present invention provides a digital edge tuning circuit for tuning phases of an input signal and a clock signal. The digital edge tuning circuit comprises a delay-tuning circuit, for receiving the input signal and delaying the input signal to generate a fine-tuned signal; a delay set, comprising a plurality of delays connected serially one by one, wherein the input of the delay set is coupled to the fine-tune circuit for receiving the fine-tuned signal; a plurality of sample/hold circuits, each of the sample/hold circuits coupled to a corresponding output of one of the delays and the fine-tune circuit, for sampling and holding the corresponding output; and a dynamic edge tuning circuit, coupled to the sample/hold circuits, for controlling a common delay time delayed by the delay-tuning circuit according to which one of the sample/hold circuits samples a data edge of the input signal.

In one embodiment of the present invention, the dynamic edge tuning circuit comprises an edge detect and glitch filter logic, coupled to each of the sample/hold circuits, for receiving the corresponding output; a plurality of counters, coupled to the edge detect and glitch filter logic, for generating a triggering signal corresponding to one of the counters when the corresponding counter counts to a predetermined value, wherein each of the counters corresponding to one of the sample/hold circuits such that the edge detect and glitch filter logic increases the counter when the corresponding sample/hold circuit samples the data edge; and a tuning control logic, coupled to the counters, for receiving the triggering signal, resetting the counters when the triggering signal is received and determining the common delay time delayed by the delay-tuning circuit according to which one of the counter generates the triggering signal.

In another aspect, the present invention provides a digital edge tuning method, comprising: receiving an input signal and a clock signal; providing a plurality of delayed input signals in response to the input signal, each of the delayed input signals being delayed from the input signal by an associated period of time, wherein the associated period of time comprising a common delay time which is the same for all delayed input signals and a corresponding delay time; and controlling the common delay time according to which one of the delayed input signals is synchronized with the clock signal such that a specified one of the delayed input signal is synchronized with the clock signal.

In one embodiment, the step of controlling the common delay time according to which one of the delayed input signals is synchronized with the clock signal comprises: increasing the common delay time when the associated period of time of one of the delayed input signals, which is synchronized with the clock signal, is smaller than the associated period of time of the specified one of the delayed input signal; and decreasing the common delay time when the associated period of time of one of the delayed input signals, which is synchronized with the clock signal, is larger than the associated period of time of the specified one of the delayed input signal.

Accordingly, the present invention avoids using high frequency clock for sampling the input signal and therefore saves power and does not have to maintain a reliable very high frequency clock.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4 is a pseudo code for representing operation of the tuning control logic in FIG. 3.

DESCRIPTION OF THE PREFERRED EMBODIMENTS

Figure 1:
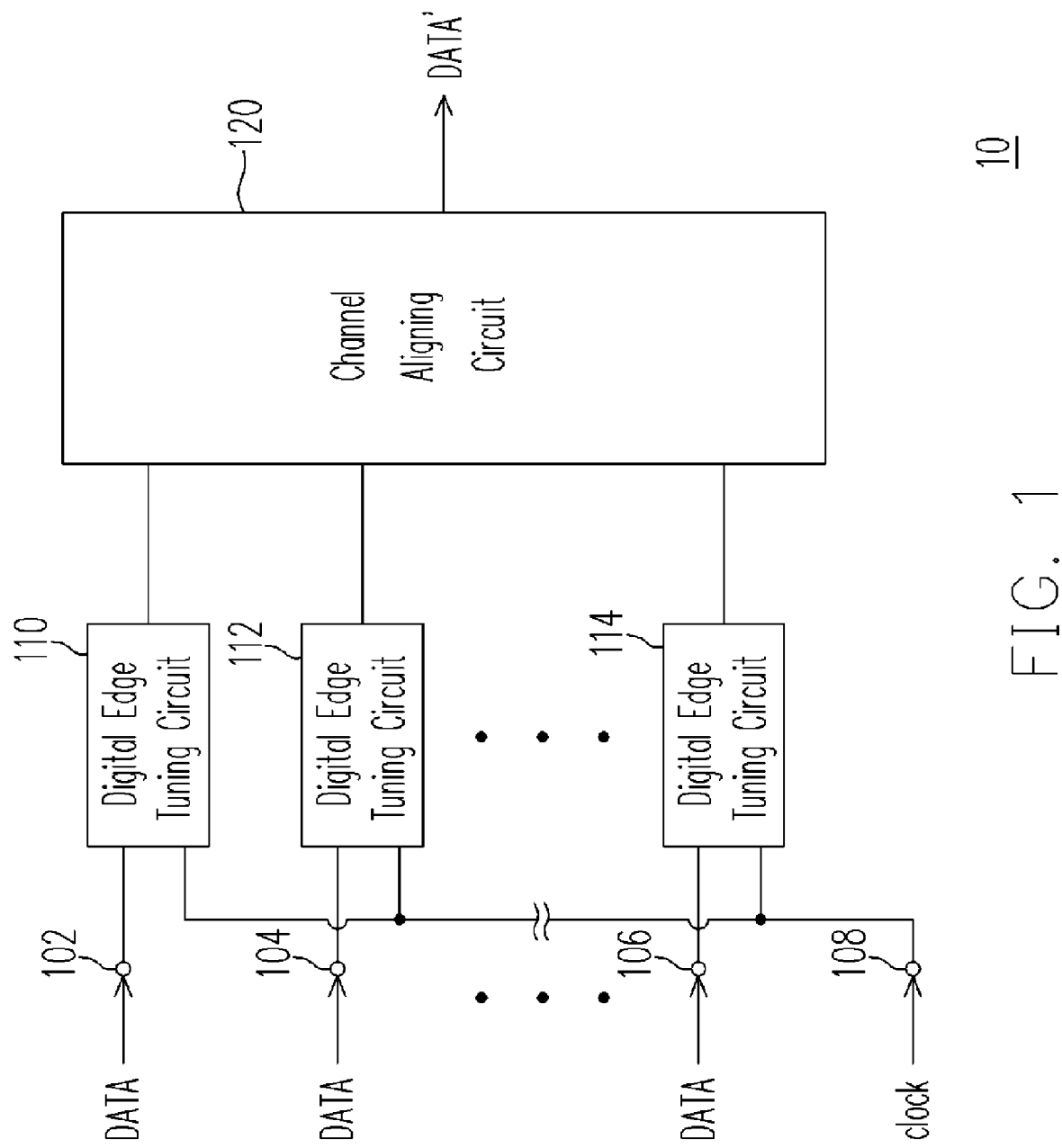
FIG. 1 is a circuitry block diagram of a multi-channel receiver according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Referring to FIG. 1, which is a circuitry block diagram of a multi-channel receiver according to one embodiment of the present invention, the multi-channel receiver 10 comprises a plurality of input ports 102, 104 and 106, a clock input port 108, a plurality of digital edge tuning circuit 110, 112 and 114, and a channel aligning circuit 120. Data are input to the multi-channel receiver 10 so that each of the input ports 102, 104 and 106 receives data in corresponding one of the channels as an input signal. Each of the digital edge tuning circuits 110, 112 and 114 couples to a corresponding one of the input ports 102, 104 and 106 for receiving the input signal. For example, the digital edge tuning circuit 110 couples to the input port 102, the digital edge tuning circuit 112 couples to the input port 104 and the digital edge tuning circuit 114 couples to the input port 106. Further, a clock signal is also received via the clock input port 108, and the clock signal is sent to each of the digital edge tuning circuits 110, 112 and 114 for performing edge tuning operation. The channel aligning circuit 120 couples to the digital edge tuning circuits 110, 112 and 114 for receiving outputs therefrom.

Figure 2:
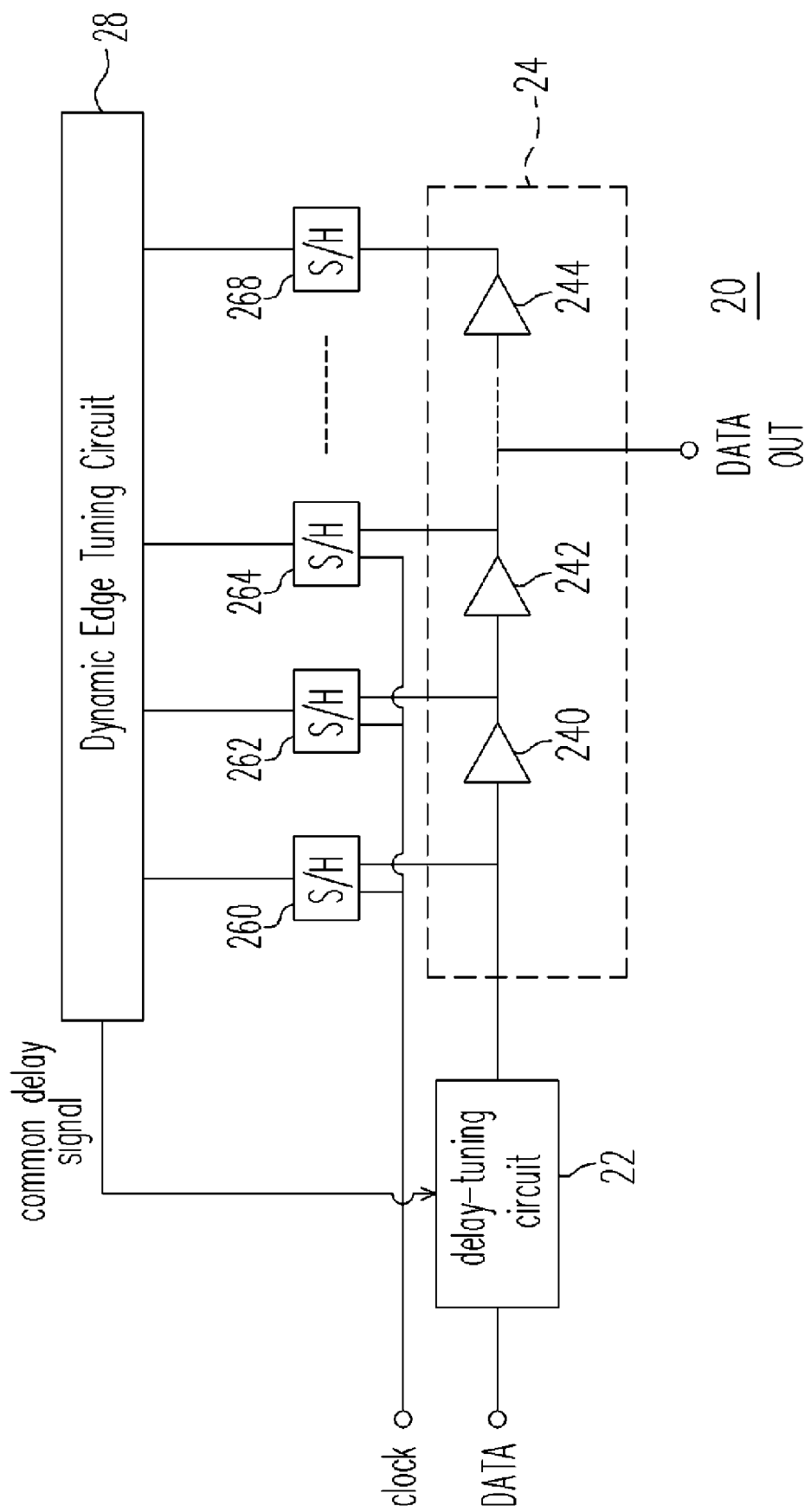
FIG. 2 is a circuitry block diagram of a digital edge tuning circuit according to one embodiment of the present invention.

One embodiment of the digital edge tuning circuits 110, 112 or 114 is illustrated in FIG. 2. The digital edge tuning circuit 20 comprises a delay-tuning circuit 22, a delay set 24, a plurality of sample/hold circuits 260, 262, 264 and 268, and a dynamic edge tuning circuit 28.

The delay-tuning circuit 22 couples to an input port for receiving the input signal DATA. The input signal DATA is delayed by the delay-tuning circuit 22 to generate a fine-tuned signal as output. The output fine-tuned signal is sent to the delay set 24 for further delay operation.

The delay set 24 comprises a plurality of delays 240, 242 and 244, which are serially connected. Further, each output of the delay-tuning circuit 22 and delays 240, 242 and 244 is coupled to one of the sample/hold circuits 260, 262, 264 and 268. An output terminal DATA OUT couples to the delay set 24 for outputting the corresponding output of the coupled delay.

These sample/hold circuits 260-268 sample and hold signals received from those outputs in response to the received clock signal. For example, output of the delay-tuning circuit 22 is sampled and held by the sample/hold circuit 260, output of the delay 240 is sampled and held by the sample/hold circuit 262, and so on.

The dynamic edge tuning circuit 28 coupled to the above-mentioned sample/hold circuits 260-268 generates a common delay signal to the delay-tuning circuit 22 for determining a common delay time delayed by the delay-tuning circuit 22. The dynamic edge tuning circuit 28 determines the common delay time according to which one of the sample/hold circuits 260-268 samples a rising edge or a falling edge of the delayed input signal such that the data edge could be output from the output terminal DATA OUT.

Figure 3:
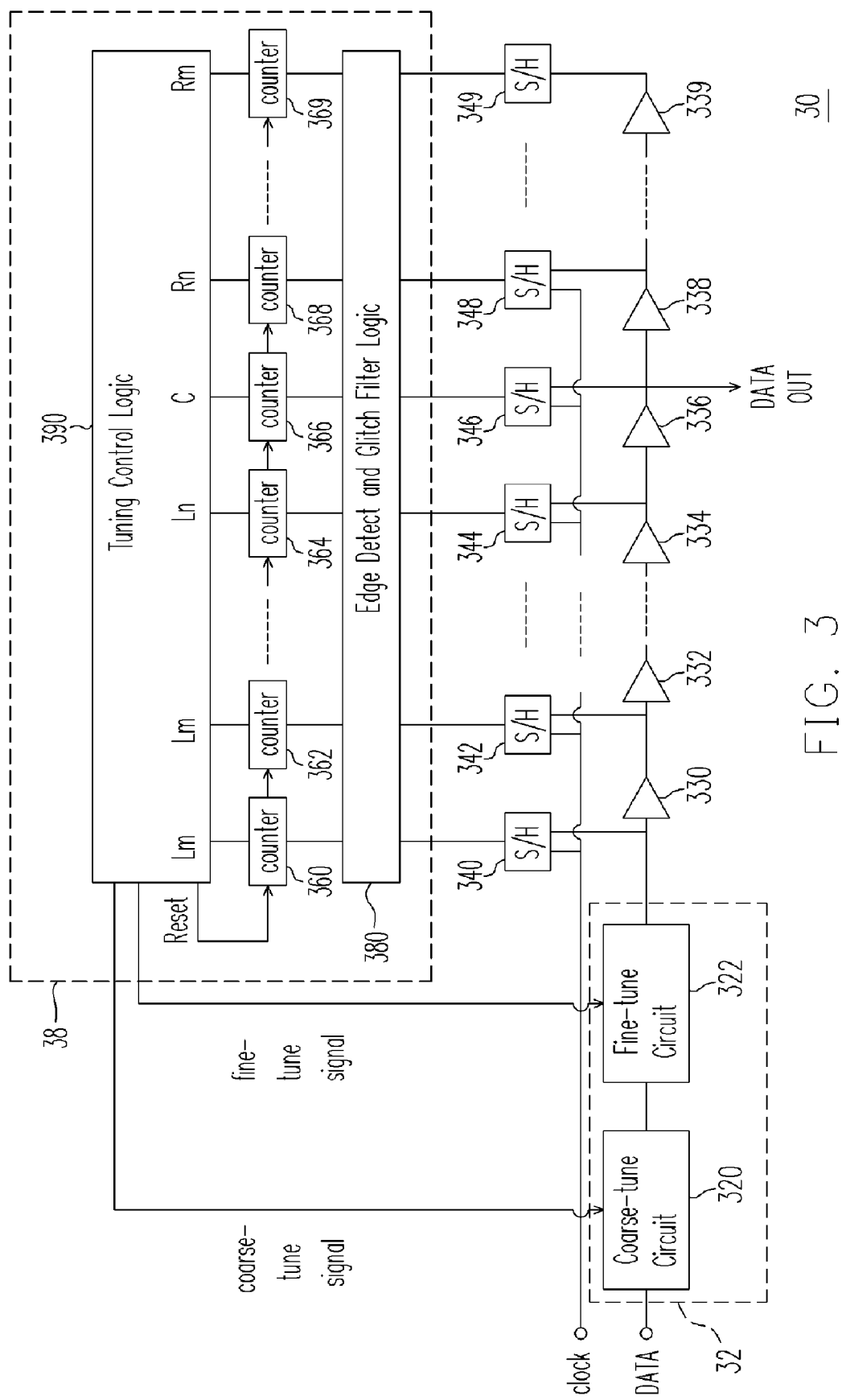
FIG. 3 is a circuitry block diagram of a digital edge tuning circuit according to another embodiment of the present invention.

For more detailed description, reference is made to FIG. 3, which is a circuitry block diagram of a digital edge tuning circuit according to another embodiment of the present invention. In the embodiment, the digital edge tuning circuit 30 comprises a delay-tuning circuit 32, a plurality of delays 330-339, a plurality of sample/hold circuits 340-349 and a dynamic edge tuning circuit 38. The dynamic edge tuning circuit 38 further comprises an edge detect and glitch filter logic 380, a plurality of counters 360-369 and a tuning control logic 390.

In the embodiment, the above-mentioned delay-tuning circuit 32 comprises a coarse-tune circuit 320 and a fine-tune circuit 322. The coarse-tune circuit 320 delays the received input signal DATA for a first time period to generate a coarse-tuned signal, and the fine-tune circuit 322 delays the coarse-tuned signal for a second time period. Operations of delays 330-339 and corresponding sample/hold circuits 340-349 are the same of those in the previous embodiment, and therefore no further descriptions are made here.

In the embodiment, outputs of sample/hold circuits 340-349 are received by the edge detect and glitch filter logic 380. The edge detect and glitch filter logic 380 detects which one of the sample/hold circuits 340-349 samples the data edge (one of the rising edge and the falling edge, determined by spec.), and filters possible glitch occurred in the received input signal so that the glitch in the input signal would not affect the normal operation of the edge detection.

Each of the counters 360-369 corresponds to one of the sample/hold circuits 340-349, i.e., one of the counters 360-369 is increased under control of the edge detect and glitch filter logic 380 when the corresponding sample/hold circuit samples the data edge. For example, the counter 360 corresponds to the sample/hold circuit 340, and the counter 362 corresponds to the sample/hold circuit 342. Accordingly, when the sample/hold circuit 340 samples the data edge, the counter 360 is increased under control of the edge detect and glitch filter logic 380; when the sample/hold circuit 342 samples the data edge, the counter 362 is increased under control of the edge detect and glitch filter logic 380. Further, each of the counters 360-369 generates a triggering signal to the tuning control logic 390 when it counts to a predetermined value.

The predetermined values of the counters 360-369 can be same; however, these predetermined values can be divided into several groups as well. For example, counters 360, 362 and 369, which are far away from the center counter 366, might have a predetermined value m, and counters 364 and 368. which are close to the center counter 366, might have a different predetermined value n, wherein n is smaller than m. However, in other cases, the counters might be divided into several groups, for example, more than 2 groups, and predetermined values of counters being closer to the center counter 366 might be greater than that of counter far away from the center counter 366.

The tuning control logic 390 couples to the counters 360-369 for receiving the triggering signal. A reset signal is sent to the counters 360-369 by the tuning control logic 390 when a triggering signal is received. The common delay time, which is the time period delayed by the coarse-tune circuit 320 and fine-tune circuit 322, is controlled by the tuning control logic according to which one of the counters 360-369 generates the triggering signal.

For effectively operating the multi-channel receiver, the present invention provides a digital edge tuning method. A plurality of delayed input signals is generated in response to the input signal. Each of the delayed input signals being delayed from the input signal by an associated period of time, wherein the associated period of time comprising a common delay time, which is the same for all delayed input signals, and a corresponding delay time. Further, the common delay time is tuned according to which one of the delayed input signals is synchronized with the clock signal such that a specified one of the delayed input signal is synchronized with the clock signal. That is, the common delay time is tuned such that the data edge could be sensed at sample/hold circuit 346, and therefore being output from output of the delay 336, i.e., the output terminal DATA OUT.

One embodiment of the digital edge tuning method is shown in FIG. 4. FIG. 4 illustrates an exemplary pseudo code representing operation of the tuning control logic in FIG. 3. In the embodiment, when the parameter "Search" is 1, the above mentioned first time period delayed by the coarse-tune circuit 320 is tuned, which is called coarse-tuning, such that the common delay time for the input signal DATA is tuned as well. The delay-tuning operation is performed allow the sampling of the data edge in the sample/hold circuits 340-349. After the data edge being sampled in the sample/hold circuits 340-349, the parameter "Search" is set to 0 such that the first time period is fixed, and the above mentioned second time period starts to be tuned, which is called fine-tuning. In the embodiment, a fine tune range is set between 0 and 31 because of the hardware limitation (i.e., there are thirty-one delays and thirty-two sample/hold circuits), however, it is not a necessary limitation because the hardware could be easily changed.

To tune the common delay time, the common delay time is increased when the associated period of time of one of the delayed input signals, which is synchronized with the clock signal, is smaller than the associated period of time of the specified one of the delayed input signals (i.e., the delay time of the output signal at the output terminal DATA OUT). Otherwise, the common delay time is decreased when the associated period of time of one of the delayed input signals, which is synchronized with the clock signal, is larger than the associated period of time of the specified one of the delayed input signals.

For example, when counters with a marked label Lm, such as counters 360 or 362 in FIG. 3, sends the triggering signal, 4 time units are added into the second time period. When counters with a marked label Ln, such as counter 364 in FIG. 3, sends the triggering signal, 1 time unit is added into the second time period. Further, when counters with a marked label Rn, such as counter 368 in FIG. 3, sends the triggering signal, 1 time unit is subtracted from the second time period. When counters with a marked label Rm, such as counter 369 in FIG. 3, sends the triggering signal, 4 time unit is subtracted from the second time period. Furthermore, once when one counter sends the triggering signal to the tuning control logic 390, all the counters 360-369 are reset by a reset signal. Besides, when the second time period (indicated by the parameter "FineTune") is at a predetermined range (for example, less than 4 or large than 28 in the embodiment), the fine-tuning operation is stopped and the coarse-tuning operation is again started.

It will be apparent to those skilled in the art that various modifications and variations can be made to the structure of the present invention without departing from the scope or spirit of the invention. In view of the foregoing description, it is intended that the present invention covers modifications and variations of this invention if they fall within the scope of the following claims and their equivalents.

What is claimed is:

1. A multi-channel receiver, comprising:
   a plurality of input ports, each of the input ports receiving an input signal;
   a plurality of digital edge tuning circuits, each of the digital edge tuning circuits coupled to a corresponding one of the input ports for receiving the input signal, each of the digital edge tuning circuits comprising:
     a delay-tuning circuit, coupled to the input port, for receiving the input signal, the input signal being delayed to generate a fine-tuned signal;
     a delay set, comprising a plurality of delays connected serially one by one, an input of the delay set coupled to the delay-tuning circuit for receiving the fine-tuned signal;
     a plurality of sample/hold circuits, each of the sample/hold circuits coupled to a corresponding output of one of the delays and the delay-tuning circuit for sampling and holding the corresponding output;
     a dynamic edge tuning circuit, coupled to the sample/hold circuits, for controlling a common delay time delayed by the delay-tuning circuit according to which one of the sample/hold circuits samples a data edge of the input signal; and
     an output terminal, coupled to one of the delays, for outputting the corresponding output of the coupled delay; and
   a channel aligning circuit, coupled to the digital edge tuning circuits for receiving outputs from each of the digital edge tuning circuits.

2. The multi-channel receiver of claim 1, wherein the dynamic edge tuning circuit comprises:
   an edge detect and glitch filter logic, coupled to each of the sample/hold circuits, for receiving the corresponding output;
   a plurality of counters, coupled to the edge detect and glitch filter logic for generating a triggering signal corresponding to one of the counters when the corresponding counter counts to a predetermined value, wherein each of the counters corresponding to one of the sample/hold circuits such that the edge detect and glitch filter logic increases the counter when the corresponding sample/hold circuit samples the data edge; and
   a tuning control logic, coupled to the counters, for receiving the triggering signal, resetting the counters when the triggering signal is received, and determines the common delay time delayed by the delay-tuning circuit according to which one of the counters generates the triggering signal.

3. The multi-channel receiver of claim 2, wherein the counters comprises:
a first counter set, for generating the triggering signal when the first counter set counts to n; and
a second counter set, for generating the triggering signal when the second counter set counts to m,
wherein n is smaller than m.

4. The multi-channel receiver of claim 1, wherein the delay-tuning circuit comprises:
a coarse-tune circuit, coupled to the input port, for receiving the input signal, the input signal being delayed for a first time period to generate a coarse-tuned signal; and
a fine-tune circuit, coupled to the coarse-tune circuit, for receiving the coarse-tuned signal, the coarse-tuned signal being delayed for a second time period to generate the fine-tuned signal;
wherein the common delay time controlled by the dynamic edge tuning circuit being composed by the first time period and the second time period.

5. A digital edge tuning circuit for tuning phases of an input signal and a clock signal, comprising:
a delay-tuning circuit, for receiving the input signal and delaying the input signal to generate a fine-tuned signal;
a delay set, comprising a plurality of delays connected serially one by one, an input of the delay set being coupled to the delay-tuning circuit for receiving the fine-tuned signal;
a plurality of sample/hold circuits, each of the sample/hold circuits coupled to a corresponding output of one of the delays and the delay-tuning circuit for sampling and holding the corresponding output; and
a dynamic edge tuning circuit, coupled to the sample/hold circuits, for controlling a common delay time delayed by the delay-tuning circuit according to which one of the sample/hold circuits samples a data edge of the input signal.

6. The digital edge tuning circuit of claim 5, wherein the dynamic edge tuning circuit comprises:
an edge detect and glitch filter logic, coupled to each of the sample/hold circuits, for receiving the corresponding output;
a plurality of counters, coupled to the edge detect and glitch filter logic for generating a triggering signal corresponding to one of the counters when the corresponding counter counts to a predetermined value, wherein each of the counters corresponding to one of the sample/hold circuits such that the edge detect and glitch filter logic increases the counter when the corresponding sample/hold circuit samples the data edge; and
a tuning control logic, coupled to the counters, for receiving the triggering signal, resetting the counters when the triggering signal is received, and determining the common delay time delayed by the delay-tuning circuit according to which one of the counters generates the triggering signal.

7. The digital edge tuning circuit of claim 6, wherein the counters comprises:
a first counter set, for generating the triggering signal when the first counter set counts to n; and
a second counter set, for generating the triggering signal when the second counter set counts to m,
wherein n is smaller than m.

8. The digital edge tuning circuit of claim 5, wherein the delay-tuning circuit comprises:
a coarse-tune circuit, coupling to the input port for receiving the input signal, the input signal being delayed for a first time period to generate a coarse-tuned signal; and
a fine-tune circuit, coupling to the coarse-tune circuit for receiving the coarse-tuned signal, the coarse-tuned signal being delayed for a second time period to generate the fine-tuned signal;
wherein the common delay time controlled by the dynamic edge tuning circuit being composed by the first time period and the second time period.

9. A digital edge tuning method, comprising:
receiving an input signal and a clock signal;
providing a plurality of delayed input signals in response to the input signal, each of the delayed input signals being delayed from the input signal by an associated period of time, wherein the associated period of time comprising a common delay time which is the same for all delayed input signals and a corresponding delay time; and
controlling the common delay time according to which one of the delayed input signals is synchronized with the clock signal such that a specified one of the delayed input signals is synchronized with the clock signal.

10. The digital edge tuning method of claim 9, wherein the step of controlling the common delay time according to which one of the delayed input signals is synchronized with the clock signal such that a specified one of the delayed input signals is synchronized with the clock signal, comprises:
increasing the common delay time when the associated period of time of one of the delayed input signals, which is synchronized with the clock signal, is smaller than the associated period of time of the specified one of the delayed input signals; and
decreasing the common delay time when the associated period of time of one of the delayed input signals, which is synchronized with the clock signal, is larger than the associated period of time of the specified one of the delayed input signals.

11. The digital edge tuning method of claim 10, further comprising:
increasing the common delay time when none of the delayed input signals is synchronized with the clock signal.

* * * * *